(12) United States Patent
Boeshans et al.

(10) Patent No.: US 9,776,135 B2
(45) Date of Patent: Oct. 3, 2017

(54) EXHAUST TREATMENT SYSTEM HAVING AN SCR WITH A CENTER INLET

(71) Applicant: CNH Industrial America, LLC, New Holland, PA (US)

(72) Inventors: James Boeshans, Hawley, MN (US); Jay Larson, Fargo, ND (US); David Tveito, West Fargo, ND (US); Russell Stoltman, Argusville, ND (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/406,765

(22) PCT Filed: Jun. 14, 2013

(86) PCT No.: PCT/US2013/045776
§ 371 (c)(1),
(2) Date: Dec. 10, 2014

(87) PCT Pub. No.: WO2013/188728
PCT Pub. Date: Dec. 19, 2013

(65) Prior Publication Data
US 2015/0165378 A1    Jun. 18, 2015

Related U.S. Application Data

(60) Provisional application No. 61/659,641, filed on Jun. 14, 2012.

(51) Int. Cl.
*B01D 50/00* (2006.01)
*B01D 53/94* (2006.01)
(Continued)

(52) U.S. Cl.
CPC ......... *B01D 53/9477* (2013.01); *F01N 3/103* (2013.01); *F01N 3/2066* (2013.01);
(Continued)

(58) Field of Classification Search
CPC .. F01N 3/103; F01N 2240/20; F01N 2490/02; B01D 53/9477; Y02T 10/24
(Continued)

(56) References Cited

U.S. PATENT DOCUMENTS

| 2010/0050618 A1 | 3/2010 | Huthwohl et al. | |
| 2010/0107612 A1* | 5/2010 | Yamazaki | B01D 53/90 60/295 |
| 2011/0146236 A1* | 6/2011 | Sun | F01N 3/021 60/274 |

FOREIGN PATENT DOCUMENTS

| CN | 2387269 Y | 7/2000 |
| CN | 101333956 A | 12/2008 |

(Continued)

OTHER PUBLICATIONS

International Search Report—PCT/US2013/045776, (5 Pages), Dated Aug. 22, 2013.
(Continued)

*Primary Examiner* — Tom P Duong
(74) *Attorney, Agent, or Firm* — Rickard K. DeMille; Rebecca L. Henkel

(57) ABSTRACT

An exhaust treatment system for a work vehicle, which has an exhaust conduit transmitting an exhaust flow from an engine and to a DOC system, is disclosed. The DOC system has a reductant introduced and mixed into the exhaust flow, and a DOC conduit connects the DOC to a center inlet of an SCR. The SCR includes at least two exhaust chambers. When the exhaust flow enters the SCR at the center inlet, the exhaust flow enters a central chamber where it is split into at least two separate exhaust flows which are moved in at least two different directions away from each other. Each separate exhaust flow is moved through a separate exhaust chamber and substrate. A conduit moves at least one of the separate exhaust flows into an area holding another exhaust (Continued)

flow, and the two separate exhaust flows are combined and expelled through an outlet.

19 Claims, 2 Drawing Sheets

(51) Int. Cl.
    *F01N 3/10*     (2006.01)
    *F01N 3/20*     (2006.01)
    *F01N 13/00*     (2010.01)

(52) U.S. Cl.
    CPC ........ *F01N 13/017* (2014.06); *F01N 2240/20* (2013.01); *F01N 2470/02* (2013.01); *F01N 2470/18* (2013.01); *F01N 2490/02* (2013.01); *F01N 2490/06* (2013.01); *Y02T 10/24* (2013.01)

(58) Field of Classification Search
    USPC .................................................. 422/168, 171
    See application file for complete search history.

(56) References Cited

FOREIGN PATENT DOCUMENTS

| | | |
|---|---|---|
| CN | 102292526 A | 12/2011 |
| CN | 102364067 A | 2/2012 |
| DE | 102010021438 B4 | 1/2014 |
| EP | 2126294 B1 | 9/2010 |
| EP | 1770253 B1 | 9/2012 |
| WO | WO 2010/078052 A1 | 7/2010 |
| WO | WO 2011154254 A1 | 12/2011 |

OTHER PUBLICATIONS

International Written Opinion—PCT/US2013/045776, (5 Pages), Dated Aug. 22, 2013.
Office Action for Chinese Application No. 201380024918.3 dated Jan. 13, 2017 (19 pages).
Office Action for Chinese Application No. 201380024918.3 dated May 23, 2016 (17 pages).

\* cited by examiner

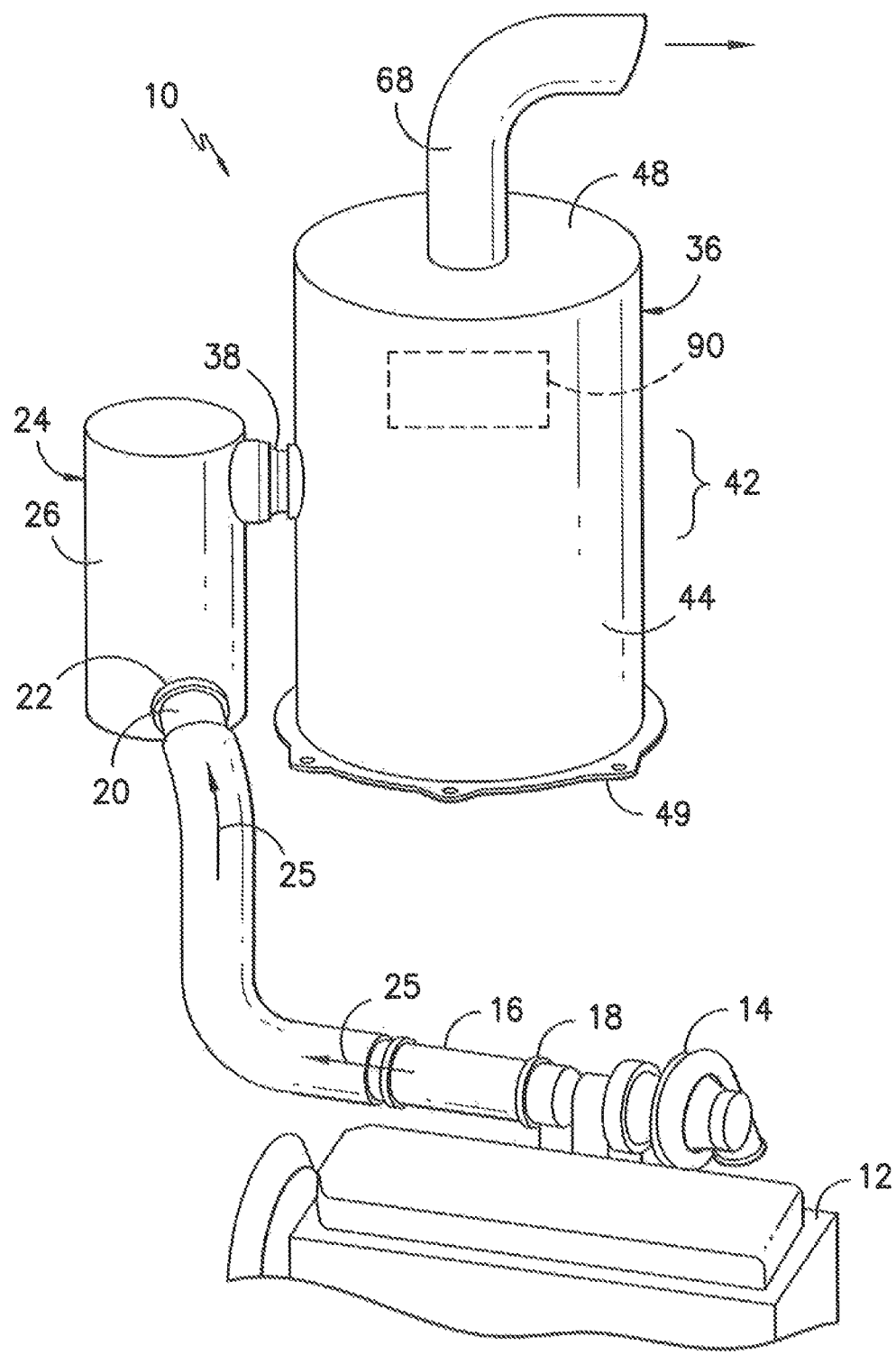
FIG. -1-

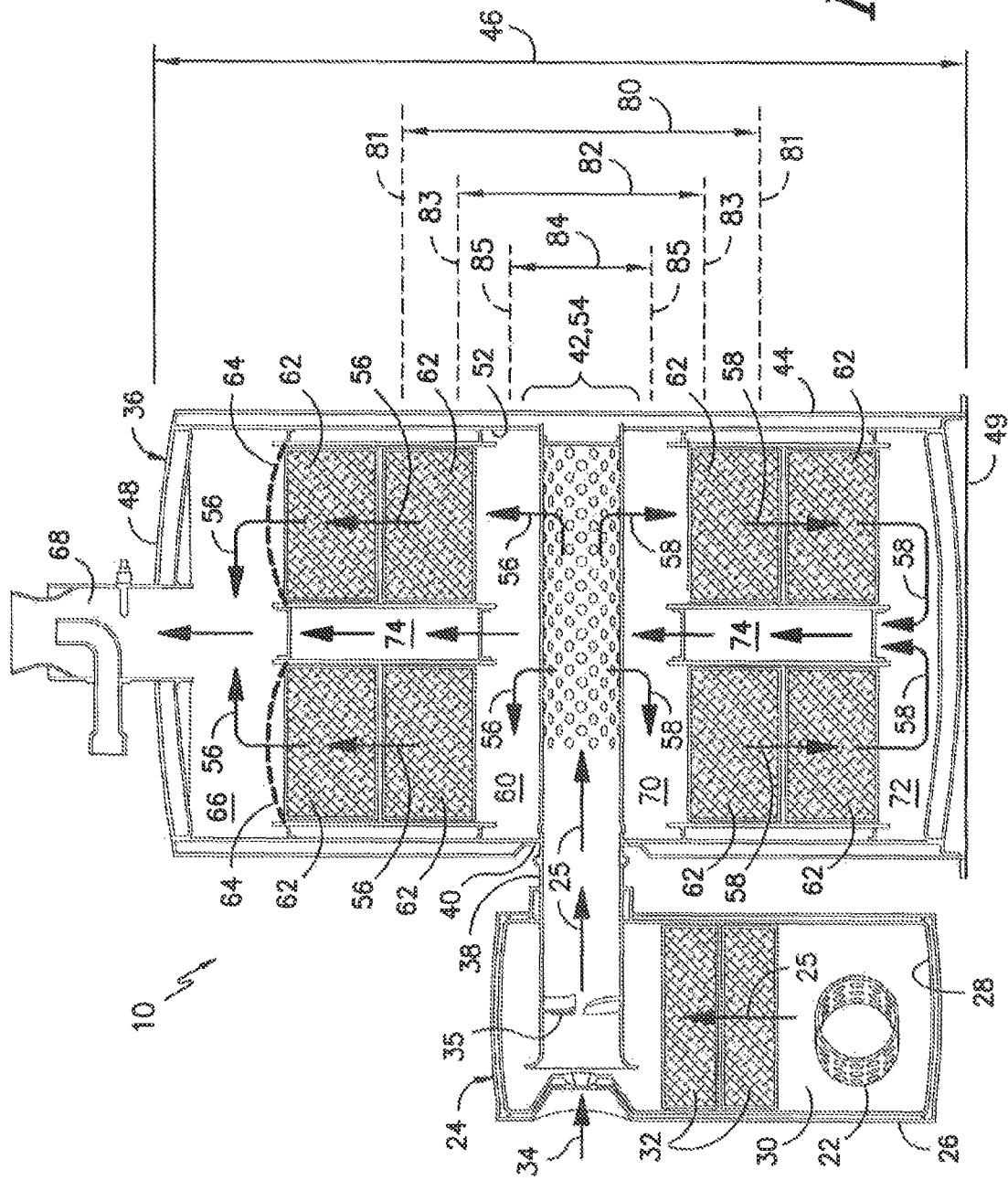

EXHAUST TREATMENT SYSTEM HAVING AN SCR WITH A CENTER INLET

CROSS-REFERENCE TO RELATED APPLICATIONS

This application is a nationalization of PCT/US2013/045776, filed Jun. 14, 2013, entitled "Exhaust Treatment System Having an SCR with a Center Inlet," which is based upon and claims priority to U.S. Provisional Patent Application No. 61/659,641, filed Jun. 14, 2012, the disclosures of both of which are hereby incorporated by reference herein in their entirety for all purposes.

BACKGROUND

The present disclosure relates to engine exhaust treatment systems and more particularly to the size, orientation, and locations of components in an SCR system of an exhaust treatment system for a work vehicle.

A selective catalytic reduction (SCR) system may be included in an exhaust treatment system for a power system to remove or reduce nitrous oxide (NOx or NO) emissions coming from the exhaust of an engine, SCR systems use a diesel oxidation catalyst (DOC) system which includes diesel engine fluid (DEF) reductant(s) which may include, for example, urea, that are introduced into the exhaust flow.

In a work vehicle, such as a tractor, an excavator, and the like, more external components are being added, which may prevent an operator from adequately seeing a field or a work operation. New emissions requirements in many countries require emissions to be reduced. The equipment to reduce emissions, such as exhaust treatment systems, require additional components which must lit under the hood, and/or in some external location on the work vehicle. These components must operate effectively but must not limit an operator's view. Further, such exhaust treatment systems also cannot extend outwardly away from the vehicle such that they would block access to other components or they would inadvertently contact other objects during operation.

SUMMARY

In one aspect of the present disclosure, an exhaust treatment system for a work vehicle is provided. The exhaust treatment system includes an exhaust conduit transmitting an exhaust flow from an engine. The system also includes a DOC system connected to the exhaust conduit. The DOC system has a reductant introduced and mixed into the exhaust flow. A DOC conduit connects the DOC to a center inlet of an SCR. The system further includes an SCR. The SCR has upper and lower exhaust chambers. When the exhaust flow enters the SCR at the center inlet, the exhaust flow enters a central chamber where it is split into upper and lower exhaust flows. The upper exhaust flow is moved upward through the upper exhaust chamber and through substrate therein, to an upper exhaust area. Simultaneously, the lower exhaust flow is moved from the central chamber downward through a lower exhaust chamber and through substrate therein, to a lower exhaust area. A longitudinal conduit extends between and connects the lower and upper exhaust areas. The lower exhaust flow is moved upward through the longitudinal conduit to the upper exhaust area where it combines with the upper exhaust flow. The combined exhaust flows are expelled through an outlet formed in an upper end of the SCR.

In another aspect of the present disclosure, an exhaust treatment system for a work vehicle is provided. The system includes an exhaust conduit transmitting an exhaust flow from an engine. The system also includes a DOC system connected to the exhaust conduit. The DOC system has a reductant introduced and mixed into the exhaust flow. The DOC system also has a DOC conduit which connects the DOC to a center inlet of an SCR. The system further includes an SCR which desirably has at least two exhaust chambers. When the exhaust flow enters the SCR at the center inlet, the exhaust flow enters a central chamber where it is split into separate exhaust flows which are moved in different directions away from each other. Each separate exhaust flow is moved through a separate exhaust chamber and substrate. A conduit moves at least one exhaust flow into an area holding another exhaust flow, and the exhaust flows are combined and expelled through an outlet.

BRIEF DESCRIPTION OF THE DRAWINGS

FIG. 1 is an isometric view of the exhaust treatment system, showing an exhaust conduit connected to an outlet of a turbocharger of an engine, the exhaust flow moved through the conduit to the DOC and into a center inlet of the SCR, where the exhaust is moved through the SCR and expelled through an outlet; and FIG. 2 is a cross-sectional view of the exhaust treatment system of FIG. 1, showing the internal components of the DOC and SCR, and the exhaust flow separated into upper and lower exhaust flow chambers.

DETAILED DESCRIPTION

FIG. 1 shows an exhaust treatment system 10 of a work vehicle (not shown) including an SCR with a center inlet. The work vehicle includes an engine 12 which may include a turbocharger 14. An exhaust conduit 16 is desirably, but not by way of limitation, connected at a first end 18 to the turbocharger 14 of the engine 12. Alternatively, it will be understood that the exhaust conduit 16 may be connected to other outlets associated with the engine 12 to receive an exhaust flow. The exhaust conduit 16 includes a second end 20 which is desirably connected to an inlet 22 of a DOC 24. It will be appreciated that the exhaust flow 25 moves from the turbocharger 14 through the exhaust conduit 16 and into the DOC 24. The DOC 24 comprises a housing 26 which may be cylindrically shaped, although other configurations may be equally operable.

The housing 26, as illustrated in FIG. 2, includes an inner surface 28 which defines an inner compartment 30. The exhaust flow 25 enters the inner compartment 30 of the housing 26 and desirably moves through one or more DOC substrates 32 which act as filters. In at least one area of the housing 26, one or more reductants 34 are injected into a mixing chamber or mixer 35 of the inner compartment 30, where the reductants 34 mix with the exhaust gases of the exhaust flow 25.

The DOC 24 oxidizes carbon monoxide (CO) and unburnt hydrocarbons (HG) into carbon dioxide ($CO_2$). The DOC substrate 32 is configured to collect particulate matter or soot. The SCR 36 is configured to reduce an amount of NOx in the exhaust flow 25 in the presence of at least one reductant 34. With regard to position, the DOC 24 may be in-line with the SCR 36, or the DOC 24 may be included with the SCR 36 in any position (not shown).

The reductants 34 may be held in a separate compartment (not shown) or may be included in the housing 26 of the DOC 24 (not shown). A pump or comparable mechanism (not shown) desirably moves the reductants from its compartment and into the mixer 30.

The exhaust flow 25 moves through a conduit 38 from the DOC 24 to an inlet 40 in the SCR 36, which may be positioned substantially near or at a mid-section or center 42 of the SCR housing 44. The SCR housing 44 has a length 46 which extends between upper and lower ends 48, 49 of the housing. Relative to the length 46 of the housing 44, the center 42 is desirably located about 35% away from each upper and lower end 48, 49 of the SCR housing 44. For instance, as shown in FIG. 2, the center 42 may be located within a first percentage range 80 extending between opposed endpoints 81, with each endpoint 81 being defined at a distance from each end 48, 49 of the SCR housing 44 that is equal to 35% of the length 46 of the housing 44. More desirably, relative to the length 46 of the housing 44, the center 42 is desirably located about 40% away from each upper and lower end 48, 49 of the SCR housing 44. In such instance, the center 42 may be located within a second percentage range 82 extending between opposed endpoints 83, with each endpoint 83 being defined at a distance from each end 48, 49 of the SCR housing 44 that is equal to 40% of the length 46 of the housing 44. Even more desirably, relative to the length 46 of the housing 44, the center 42 is desirably located about 45% away from each upper and lower end 48, 49 of the SCR housing 44. In such an embodiment, the center 42 may be located within a third percentage range 84 extending between opposed endpoints 85, with each endpoint 85 being defined at a distance from each end 48, 49 of the SCR housing 44 that is equal to 45% of the length 46 of the housing 44. "Substantially," as used herein, means plus or minus 10% of each percentage range stated above.

It should be appreciated that, as shown in the illustrated embodiment, the DOC 24 may be spaced apart or may otherwise be separate from the SCR housing 44. Alternatively, the DOC 24 may be incorporated into or formed integrally with the SCR housing 44.

The SCR 36 may also, but not by way of limitation, have a cylindrical shape. It will be appreciated, however, that the SCR may comprise any configuration so long as the SCR 36 operates as shown and/or described herein. The SCR housing 44 has an inner surface 52 which defines a number of separate internal chambers. When the exhaust flow 25 moves through the conduit 38 and into the inlet 40 of the SCR 36, it moves into a central chamber 54 and splits into at least two separate exhaust flows. An upper exhaust flow 56 is directed upward (FIG. 2), while a lower exhaust flow 58 is directed downward (directions are relative to the FIGS. 1 and 2, illustrated; it will be understood that the SCR and its associated DOC and components are desirably, but not by way of limitation, oriented substantially vertically).

The upper exhaust flow 56 moves upward through at least one opening into an upper exhaust chamber 60. The upper exhaust chamber 60 includes one or more substrates 62 therein (also referred to herein as "upper substrates"). Baffles 64 may be desirably positioned immediately above the substrates 62. After the upper exhaust flow 56 moves upward through the substrates 62 and baffles 64, the upper exhaust flow 56 moves into an upper exhaust area 66 having an outlet 68 desirably at an upper end 48 of the SCR housing 44.

Simultaneously, the lower exhaust flow 58 moves through at least one opening into a lower exhaust chamber 70. The lower exhaust chamber 70 includes one or more substrates 62 therein (also referred to herein as "lower substrates").

After the lower exhaust flow 58 moves downward through the substrates 62, the lower exhaust flow 58 moves into a lower exhaust area 72 which includes a longitudinal conduit 74 which extends between the lower exhaust area 72 and the upper exhaust area 66. The lower exhaust flow 58 moves upward through the longitudinal conduit 74 and into the upper exhaust area 66, where, combined together with the upper exhaust flow 56, the two exhaust flows 56, 58 are expelled through the outlet 68 of the SCR housing 44. It will be appreciated that the longitudinal conduit may be positioned substantially in the SCR housing 44, or outside of the SCR housing 44 (not shown).

The baffles 64 are desirably oriented above the upper substrate chamber 60 to provide some resistance to flow in the upper exhaust chamber 60. It has been discovered that this resistance balances the upper and lower exhaust flows 56, 58 in each of the upper and lower exhaust chambers 60, 70, without causing significant backpressure. Additional baffles 64 may be used in other locations within the SCR housing 44, to further regulate exhaust flow.

The substrate(s) 32, 62 may, for example, consist of cordierite, silicon carbide, other ceramic, or metal structure, or other suitable compositions. The substrates 32, 62 may form a honeycomb structure with a plurality of through going channels or cells for the upper and lower exhaust flows 56, 58 to pass through. Alternatively, however, the substrate(s) may form any structure or configuration so long as the substrate(s) operate as described and/or shown herein.

A clean up catalyst system 90 (shown schematically in FIG. 1) may be included as a part of the SCR 36 (e.g., within the SCR housing 44), or, alternatively, as a separate component of the exhaust treatment system 10. The clean-up catalyst system requires the appropriate catalyst or other material disposed on a substrate. The clean-up catalyst may embody an ammonia oxidation catalyst (AMOX). The clean-up catalyst system is configured to capture, store, oxidize, reduce, and/or convert reductant that may slip past or breakthrough the SCR 36. The clean-up catalyst may also be configured to capture, store, oxidize, reduce, and/or convert other constituents present.

Exhaust treatment systems including an SCR have only relatively recently been required due to emissions standards. Prior art exhaust treatment systems using SCRs often utilize horizontally mounted, short and wide SCRs with substrates having high cell densities. The short and wide dimensions limit backpressure losses while the high cell densities provide high NOX conversion efficiencies by exposing the exhaust to a greater surface area of catalyst material. The horizontal mounting is utilized for structural reasons. Ceramic substrates are often used which may be heavy, especially when cell densities are high. The horizontal mounting allows the heavy substrate to be supported. The horizontal mounting is also conducive to receive the reductant(s), which are often injected in a horizontal section of the exhaust pipe.

Therefore weight, as well as the configuration and cell size of the substrate, previously dictated size and configuration of an SCR of an exhaust treatment system. The present disclosure, with a center inlet SCR 36, which uses in-line substrates and exhaust flow 25 movement and filtering in two different (and in this embodiment, but not by way of limitation, opposite) directions, allows for an elongated and more vertically-oriented exhaust treatment system 10. It will be understood that the orientation of the separate exhaust flows 56, 58 may be from about 90 degrees to about 180 degrees apart. Such an elongated and vertically oriented SCR reduces the space required for mounting it on the work vehicle. It also provides greater visibility for an operator, and is less likely to be mounted in a manner which extends outwardly or blocks access to another component of the work vehicle. For example, the SCR 36 may be mounted substantially vertically adjacent a corner of a cab of the work vehicle. It will be appreciated that many other mounting locations for the SCR 36 are possible. In another example, other machines, such as motor graders, compactors, excavators, and wheel loaders often have rear-mounted engines so the SCR 36 may be vertically mounted behind the cab of the work vehicle.

A long SCR housing 44 length 46 may enable lower cell density and larger cells or channels in the substrate 62. Because of this length 46, high cell densities may not be needed to create the surface area for upper and lower exhaust flow 56, 58 contact needed for high NOX conversion efficiencies. However, because the exhaust flow 25 is split into upper and lower exhaust flows 56, 58 in the SCR housing 44, if high cell densities are needed in the substrates 62, they may still be utilized due to the configuration for the housing 44 for split exhaust flow. In addition, because of the separation of the exhaust flow 25 in the SCR housing 44, high cell densities will not cause excessive backpressure. Therefore, the SCR cell density may be a function of SCR length 46, the separation of exhaust flows 56, 58, and the power system's characteristics.

Although the embodiments of this disclosure as described herein may be incorporated without departing from the scope of the following claims, it will be apparent to those skilled in the art that various modifications and variations can be made. Other embodiments will be apparent to those skilled in the art from consideration of the specification and practice of the disclosure. It is intended that the specification and examples be considered as exemplary only, with a true scope being indicated by the following claims and their equivalents.

What is claimed is:

1. An exhaust treatment system for a work vehicle, comprising:
    an exhaust conduit transmitting an exhaust flow from an engine;
    a diesel oxidation catalyst (DOC) system connected to the exhaust conduit, the DOC system having a reductant introduced and mixed into the exhaust flow, the DOC system including a DOC conduit;
    a selective catalytic reduction system (SCR) including:
        a center inlet coupled to the DOC conduit;
        a central chamber coupled to the center inlet;
        an upper exhaust chamber above the central chamber comprising an upper substrate;
        an upper exhaust area above the upper exhaust chamber;
        a lower exhaust chambers below the central chamber and comprising a lower substrate;
        a lower exhaust area below the lower exhaust chamber;
        a longitudinal conduit extending between the upper exhaust area and lower exhaust area;
        an outlet formed in an upper end of the upper exhaust area,
        wherein the upper and lower exhaust chambers are arranged such that, when the exhaust flow enters the SCR at the center inlet, the exhaust flow enters the central chamber where the exhaust flow is split into upper and lower exhaust flows, causing the upper exhaust flow to move upward through the upper exhaust chamber and an upper substrate, to the upper exhaust area, while simultaneously causing the lower exhaust flow to move from the central chamber downward through the lower exhaust chamber and a lower substrate to the lower exhaust area, and then upwards through the longitudinal conduit to the upper exhaust area where the lower exhaust flow combines with the upper exhaust flow, and combined exhaust flows are expelled through the outlet.

2. The exhaust treatment system of claim 1, wherein the upper exhaust chamber includes baffles.

3. The exhaust treatment system of claim 2, wherein the baffles are positioned between the upper substrate and the upper exhaust area.

4. The exhaust treatment system of claim 1, wherein the SCR is substantially vertically mounted on the work vehicle.

5. The exhaust treatment system of claim 1, wherein the system further includes a clean-up catalyst system.

6. The exhaust treatment system of claim 5, wherein the clean-up system is provided in a portion of the SCR housing.

7. An exhaust treatment system for a work vehicle, comprising:
    an exhaust conduit transmitting an exhaust flow from an engine;
    a diesel oxidation catalyst (DOC) system connected to the exhaust conduit, the DOC system having a reductant introduced and mixed into the exhaust flow, the DOC system including a DOC conduit;
    an selective catalytic reduction system (SCR) including a center inlet coupled to the DOC conduit, the SCR including at least two exhaust chambers, such that when the exhaust flow enters the SCR at the center inlet, the exhaust flow enters a central chamber where it is split into at least two separate exhaust flows which are moved in at least two different directions away from each other, each separate exhaust flow moved through a separate exhaust chamber and substrate, wherein a conduit moves at least one of the separate exhaust flows into an area holding the other exhaust flow, and the two separate exhaust flows are combined after having been separated and expelled through an outlet.

8. The exhaust treatment system of claim 7, wherein the at least two exhaust chambers include an upper exhaust chamber and a lower exhaust chamber.

9. The exhaust treatment system of claim 8, wherein the upper exhaust chamber has an upper exhaust area connected thereto, and the lower exhaust chamber has a lower exhaust area connected thereto.

10. The exhaust treatment system of claim 9, wherein a longitudinal conduit extends between and connects the lower and upper exhaust areas, and wherein an outlet is provided in the upper exhaust area.

11. The exhaust treatment system of claim 7, wherein the upper exhaust chamber includes baffles.

12. The exhaust treatment system of claim 11, wherein the baffles are positioned between the substrate and the upper exhaust area.

13. The exhaust treatment system of claim 7, wherein the SCR is substantially vertically mounted on the work vehicle.

14. The exhaust treatment system of claim 7, wherein the system further includes a clean-up catalyst system.

15. The exhaust treatment system of claim 14, wherein the clean-up system is provided in a portion of the SCR housing.

16. The exhaust treatment system of claim 7, wherein the different directions are further defined as opposite directions.

17. An exhaust treatment system for a work vehicle, comprising:

an exhaust conduit transmitting an exhaust flow from an engine;

a diesel oxidation catalyst (DOC) system coupled to the exhaust conduit, the DOC system having a reductant introduced and mixed into the exhaust flow, the DOC system including a DOC conduit;

a selective catalytic reduction system (SCR) including an SCR housing extending between an upper end and a lower end, the SCR being coupled to the DOC conduit via a center inlet defined in the SCR housing between the upper and lower ends, the SCR housing defining a central chamber generally aligned with the center inlet, an upper chamber defined between the central chamber and the upper end, and upper area defined between the upper chamber and the upper end, a lower chamber defined between the central chamber and the lower end, a lower area defined between the lower chamber and the lower end, and a conduit extending between the lower area and the upper area, wherein, when the exhaust flow enters the SCR housing at the center inlet, the exhaust flow enters the central chamber and is separated into an upper exhaust flow flowing through an upper substrate contained in the upper chamber to the upper area, and a lower exhaust flow flowing through a lower substrate contained in the lower chamber to the lower area, wherein, when the lower exhaust flow enters the lower area, the lower exhaust flow flows through the conduit to the upper area where the lower exhaust flow and upper exhaust flow are combined.

18. The exhaust treatment system of claim 17, wherein the SCR housing defines a length between the upper and lower ends, the center inlet being spaced apart from the upper and lower ends by a distance that is equal to at least 35% of the length of the SCR housing.

19. The exhaust treatment system of claim 17, further comprising at least one baffle positioned between the upper substrate and the upper end of the SCR housing.

* * * * *